(No Model.)
C. O. MAILLOUX.
APPARATUS FOR CHARGING SECONDARY BATTERIES.
No. 467,543. Patented Jan. 26, 1892.
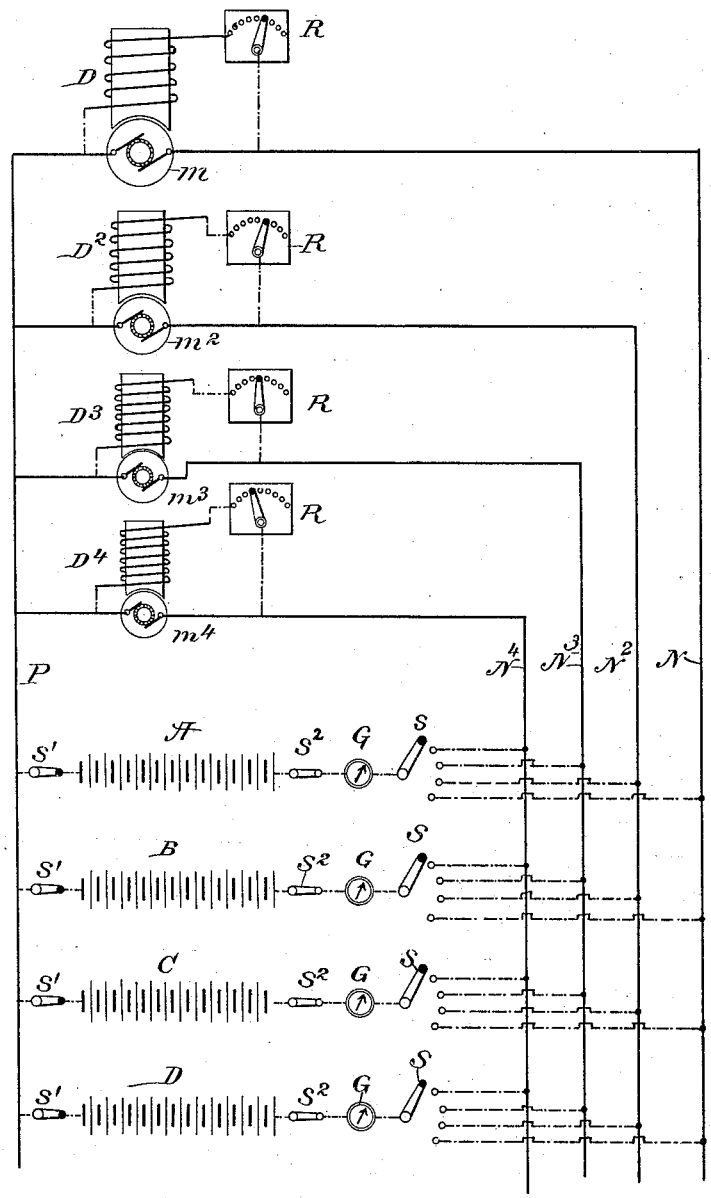

UNITED STATES PATENT OFFICE.

CYPRIEN O. MAILLOUX, OF NEW YORK, N. Y.

APPARATUS FOR CHARGING SECONDARY BATTERIES.

SPECIFICATION forming part of Letters Patent No. 467,543, dated January 26, 1892.

Application filed April 24, 1891. Serial No. 390,276. (No model.)

*To all whom it may concern:*

Be it known that I, CYPRIEN O. MAILLOUX, a citizen of the United States, and a resident of New York, in the county of New York and State of New York, have invented certain new and useful Apparatus for Charging Secondary Batteries, of which the following is a specification.

My invention relates to apparatus for charging storage-batteries designed for industrial uses or applications—such, for instance, as electric-railway traction.

My invention is of especial utility in those cases where it is necessary to provide for the charging of a large number of batteries of the same or a different number of cells in series at the same time. In the organization of apparatus heretofore employed for this purpose it has been usual to provide a pair of charging-mains kept at a definite and approximately-constant potential from any charging source—such, for instance, as one or more dynamo-machines connected to said leads and furnishing the charging-current for the batteries—and to control the potential or charging current applied to each battery by varying an artificial resistance introduced into circuit with the battery in course of charging and composed usually of wire or metal resistance whose opposition to the flow of the current is due to the low specific conductivity of the material composing it. Such resistances are objectionable on account of their cumbersomeness, and more particularly because of the constant waste of energy caused by the heating effect of the current passing through them.

The principal object of my invention is to obviate the necessity for the use of wasteful resistances, and to provide a simpler and more perfect means whereby the current of the proper strength for different stages of the charging operation may be obtained.

It is well known that in the operation of charging a storage-battery the counter electro-motive force of the battery will gradually rise as it acquires the charge, and the electro-motive force or potential applied at the beginning of the operation should be lower than at the end, in order to prevent injury to the battery at the beginning and yet to allow the whole operation to be expeditiously performed. Hence the plans previously employed for the purpose have embodied variable wire resistances which could be introduced to a great extent at the beginning of the operation, in order to cut down the full potential of the charging source, and which would be removed as the operation progressed, in order that the full potential might be applied toward the end of the operation, so as to send through the battery a proper charging-current to overcome the increased counter electro-motive force thereof. It also frequently happens that it is desirable to have means for charging batteries having a different number of cells in series, which has heretofore required the employment of the variable resistances hereinbefore mentioned.

My present invention consists in the combination, with a bank or battery of charging dynamos or sources having different potentials, of charging mains or leads extending therefrom and means for connecting the batteries to be charged to either of said mains at pleasure, so as to vary the applied potential for the purpose of obtaining the proper charging-current in the battery. In employing such an organization to charge any given battery the latter would be connected by means of the switch to the main or lead extending from that one of the bank or battery of dynamos having the lower potential, and as the charge progressed and the counter electro-motive force of the battery requiring to be overcome should rise the battery would be connected by the switch to the lead connected to the dynamo of the bank having the next higher potential, and so on through any desired or necessary numbers of dynamos to that having the largest potential required in the charging of such battery. It is ordinarily sufficient to provide three or four dynamos having different potentials or electro-motive-force capacity, so as to provide for the increased rise of potential in the battery at three or four stages of the operation.

I have in the accompanying drawing illustrated diagrammatically an arrangement of apparatus suitable for carrying out the invention.

$D\ D^2\ D^3\ D^4$ indicate four different dynamo-electric machines or sources of energy, each having its armature $m\ m^2\ m^3\ m^4$ connected to a different charging lead or main N, N², N³, or N⁴. Each machine is preferably constructed to maintain on its main or lead N, N², N³, or N⁴ an approximately constant potential and may have its field-magnet excited in shunt from the mains, as indicated, or from any suitable separate source or in any way desired. Ordinarily it is convenient to excite them in shunt and to provide a variable resistance—such as indicated at R—for each field-magnet.

The machines are so constructed that their armatures will furnish to the mains or leads different potentials or electro-motive forces, the difference in the potentials of the machines at the extremities of the range provided being that which is ordinarily required in charging the different batteries to be supplied or in the different stages of the operation for charging in one battery. The machines may be and are preferably run from the same prime mover.

In the following description it will be assumed that the armature $m$ furnishes the greater potential. The main or lead P may be one common to the mains or leads of different potential. When the machines are related as described, the difference of potential between P and N will be greater than that between P and N², and the difference will gradually fall until the main N⁴ of the machine having the least potential is reached.

A B C D indicate different batteries or groups of batteries to be charged, and S' S² suitable switches or other connecting appliances whereby the batteries may be placed in branch connections between the mains.

G G are suitable current-indicating appliances, and S S indicate switches having contacts or connections, as shown, with the charging-mains N N² N³ N⁴. In the operation of charging any battery this switch S would be turned to the contact which connects with the main N⁴ connected to the dynamo of the bank having the smaller potential, the potential of said dynamo being just sufficient to provide the proper charging-current when the electro-motive force of the battery is low. After the operation of charging has proceeded for a time, the length of which depends upon the condition of the battery and the number of cells in series, the counter electro-motive force of the battery will have risen so as to require the application of a greater potential, in order that the charging-current may flow at the proper rate. This rise of potential has been heretofore obtained by the cutting out of dead resistance. It is attained in the present case by simply throwing the switch to the next contact of the series, thereby connecting it to the next main or lead N³, which joins to the dynamo of the bank having the next higher potential. The charging now proceeds under the action of such dynamo until still a higher potential is required, in order to maintain the proper charging-current when the switch is shifted to the next contact joined to the charging-main N². The operation is repeated until finally the machine of the greatest potential required in the operation is applied to the battery through the lead and the contact of the switch connected therewith.

It will be obvious that the operation of charging any number of batteries may be carried on at once, the potential required for each at the various stages of the charging operation being obtained without interfering with the charging of other batteries whose charging may be at a different stage. It will also be obvious that there is not by my invention any necessary waste of energy through the interposition of dead resistances to cut down the charging-current to the proper amount.

While I have shown each charging-main as furnished with a charging-current from a single dynamo-machine, it is obvious that each might have two or more machines connected thereto in multiple, after the manner well known in the art of maintaining a definite potential upon a single main by the combined action of two or more dynamo-generators.

What I claim as my invention is—

1. In an apparatus for charging storage-batteries, the combination, substantially as described, of a bank or battery of dynamos having different adjusted potentials and connected to separate mains or leads, in combination with switch devices for connecting a battery to be charged to any one of said mains or leads at pleasure.

2. In an apparatus for charging storage-batteries, the combination, substantially as described, of a bank or battery of dynamos constructed to maintain each a different potential, separate mains or leads extending therefrom, and a series of switches, each having a series of contacts connected individually to said mains for placing each of the batteries in course of charging into connection with any one of said mains at pleasure.

3. In an apparatus for charging storage-batteries, the combination, substantially as described, of a series of mains N N² N³, &c., each connected with a dynamo machine or machines adapted to maintain upon said mains different electro-motive forces or potentials, and a series of switches, each having contacts connected to said mains, whereby any one of a number of batteries to be charged may be placed in connection with either of said mains at pleasure.

Signed at New York, in the county of New York and State of New York, this 22d day of April, A. D. 1891.

CYPRIEN O. MAILLOUX.

Witnesses:
WM. H. CAPEL,
T. F. CONREY.